United States Patent [19]

Branigan et al.

[11] Patent Number: 5,307,077
[45] Date of Patent: Apr. 26, 1994

[54] MULTI-SPECTRAL SEEKER ANTENNA

[75] Inventors: John T. Branigan, Claremont; Henry T. Killackey, Covina; Richard M. Pietrasz, Rancho Cucamonga, all of Calif.

[73] Assignee: Hughes Missile Systems Company, Los Angeles, Calif.

[21] Appl. No.: 854,356

[22] Filed: Mar. 18, 1992

Related U.S. Application Data

[63] Continuation-in-part of Ser. No. 627,276, Dec. 14, 1990, abandoned.

[51] Int. Cl.⁵ .................. H01Q 21/280; G01S 13/000
[52] U.S. Cl. ..................................... 343/720; 342/53; 343/725; 343/781 CA
[58] Field of Search .................. 342/53; 343/720, 725, 343/700 MS:771, 911, 911 R, 753, 909, 781 CA; H01Q 19/10-19/20, 21/28-21/30

[56] References Cited

U.S. PATENT DOCUMENTS

| | | | |
|---|---|---|---|
| 2,972,743 | 2/1961 | Svensson et al. | 343/838 |
| 3,114,149 | 12/1963 | Jessen, Jr. | 343/720 |
| 3,165,749 | 1/1965 | Cushner | 343/911 R |
| 3,394,378 | 7/1968 | Williams et al. | 343/779 |
| 3,701,158 | 10/1972 | Johnson | 343/725 |
| 3,911,433 | 10/1975 | Redman | 342/53 |
| 3,924,233 | 12/1975 | Nastronero et al. | 342/53 |
| 3,924,239 | 12/1975 | Fletcher et al. | 343/909 |
| 4,017,865 | 4/1977 | Woodward | 343/781 CA |
| 4,160,254 | 7/1979 | Wise | 343/909 |
| 4,264,907 | 4/1981 | Durand, Jr. et al. | 342/53 |
| 4,282,527 | 8/1981 | Winderman et al. | 343/725 |
| 4,477,814 | 10/1984 | Brumbaugh et al. | 343/725 |
| 4,652,885 | 3/1987 | Saffold et al. | 343/725 |
| 4,701,765 | 10/1987 | Arduini et al. | 343/897 |
| 4,866,454 | 9/1989 | Droessler et al. | 343/725 |
| 5,182,564 | 1/1993 | Burkett et al. | 343/720 |

FOREIGN PATENT DOCUMENTS

| | | | |
|---|---|---|---|
| 0178683 | 8/1986 | Japan | 343/720 |
| 0000879 | 1/1987 | Japan | 343/720 |

Primary Examiner—Rolf Hille
Assistant Examiner—Peter Toby Brown
Attorney, Agent, or Firm—Charles D. Brown; Randall M. Heald; Wanda K. Denson-Low

[57] ABSTRACT

A multi-spectral seeker system for detecting radiation in the infrared (IR) band and a plurality of radio frequency (RF) bands suitable for use in a guided missile is disclosed. The IR and RF seekers are coaxially integrated on a single gimbaled platform and share a common aperture without significant performance degradation. In the preferred embodiment, the IR seeker uses a Cassegrainian reflector assembly with surfaces reflective to IR but transparent to RF signals. The first RF seeker uses a resonant dichroic reflector antenna which is transparent to RF signals at frequencies no closer than 0.5 octaves from the dichroic reflector system operating frequency. The second RF seeker may use any suitable RF antenna system although a planar-array of multi-mode spiral antennas or a standard flat plate slotted array are preferred. The second RF seeker may operate in an active, semi-active, or passive mode. The IR seeker means and both RF seeker means together provide coaxial seeking in a single aperture covering three frequency bands without significant loss of performance in the RF antenna and IR sensor. The material on which the parabolic reflector is formed is tapered in thickness as a function of radius to eliminate phase delays introduced by the curvature as seen by the second RF seeker.

15 Claims, 5 Drawing Sheets

MULTI-SPECTRAL SEEKER ANTENNA

This application is a continuation-in-part of application Ser. No. 07/627,276 filed Dec. 14, 1990, abandoned.

BACKGROUND OF THE INVENTION

1. Field of the Invention

This invention involves radio frequency (RF) and infrared frequency (IR) seeker systems. More particularly, this invention involves multiple RF and IR seeker means mounting on gimbals. The disclosed invention is suitable for use as a forward-mounted target emissions detector for a guided missile.

2. Description of the Related Art

Seeker systems using IR and RF detection means for guiding missiles to their targets are well-known in the art. Targets such as aircraft and cruise missiles have become increasingly non-cooperative to existing IR and RF seeker systems, whether active, semi-active or passive in design. Because any such seeker system is subject to exploitation of particular weaknesses by countermeasures, an effective guided missile must have several seeker means available for target acquisition and lock. This design strategy avoids the possibility of defeat by a single countermeasure.

In particular, virtually all missile seeker systems require IR seeker capability because of its high bearing accuracy. IR seeking means become more important as targets become more maneuverable and velocities increase, especially during the terminal phase of the encounter. But IR by itself is not sufficient for most long range incoming threats because (a) detection range is relatively short, (b) performance is not adequate in certain weather conditions, and (c) very effective countermeasures are available to a target that is aware of the attack. RF seeker systems have a long range all-weather capability but do not provide the tracking accuracy of the IR seeker system. Thus, for many battle scenarios, equipping a guided missile with a plurality of seeker modes can significantly increase the engagement kill probability over that of a single or dual seeker mode.

In the art, the commonly accepted method for designing a dual-spectral seeker system involves mounting the IR system in front of a RF antenna system at the forward end of the guided missile radome. The IR seeker means typically uses Cassegrainian optics and the RF seeker system typically uses a monopulse type antenna with the usual stringent directivity requirements of high gain and low sidelobes. The azimuth and elevation difference channel nulls and beam peak symmetry provided by the RF antenna system must give steering accuracy sufficient for the application. But merely placing an IR seeker system forward of an RF antenna seeker system will seriously degrade the RF antenna radiation parameters as is known in the art. These adverse effects include (a) reduced gain, (b) increased sidelobes, and (c) difference channel degradation in the form of null-filling and asymmetric beam peaks.

Because of this difficult problem, a number of schemes have arisen in the art which combine a single IR seeker with a single RF seeker system. Although long sought, coaxial integration of an IR seeker with two or more RF seeker systems without serious performance degradation to one or more such systems is presently unknown in the art.

U.S. Pat. No. 2,972,743 issued to Svenson et al. discloses a combined infrared-radar antenna system using a Cassegrainian reflector and a RF antenna which is transparent to infrared radiation. This combination is not suited for high performance IR or monopulse RF operation because of unavoidable degradation resulting from interference between the two antenna systems. Neither does this design allow for a second RF antenna system mounted behind the combined RF-IR assembly because both the IR reflector and the first RF antenna is opaque to RF radiation.

U.S. Pat. No. 3,165,749 issued to Cushner discloses a single reflector for use in both a Cassegrainian IR system and an RF detection system. The RF seeker performance of this dual detector is necessarily compromised by the IR detection performance requirements and the design does not allow addition of a second RF seeker mode. U.S. Pat. No. 3,701,158 issued to Johnson discloses a stripline-fed slotted array with the center removed to make room for an embedded IR seeker system. This dual seeker system suffers in performance because of the removed center section of the array which seriously perturbs the amplitude distribution of the RF seeker system, causing significant sidelobe levels.

U.S. Pat. No. 4,264,907 issued to Durand, Jr. et al. discloses a dual mode seeker system but does not teach the combination of the two systems into an integrated coaxial seeker assembly. A similar dual mode seeker system is disclosed in Japanese Pat. 62-879 by Yoshizawa. Neither system is intended for coaxial operation.

U.S. Pat. No. 4,282,527 issued to Winderman et al. and U.S. Pat. No. 4,652,885 issued to Saffold et al. both disclose a multi-spectral detection system which uses a Cassegrainian reflector for both IR and RF detection. In both patents, the detected IR and RF signals are separated by apparatus located behind the Cassegrainian reflector. Neither of these designs is suitable for addition of a second coaxial RF seeker system.

U.S. Pat. No. 4,477,814 issued to Brumbaugh et al. discloses a combined RF/IR system using a common surface for radiating and absorbing RF energy and reflecting and focusing IR energy. This design uses an RF-transparent Cassegrainian mirror placed in front of an RF slotted array antenna to permit use of the full aperture area for the RF and IR portions of the combined detection system. But this design does not permit the addition of a second coaxial RF seeker system because the first RF antenna is opaque to all RF radiation. For obvious reasons, the patent neither teaches nor suggests the use of a second coaxial RF detection system integrated with the disclosed dual mode RF/IR system.

The multi-spectral imaging system of Droessler et al. (U.S. Pat. No. 4,866,454) employs a sub-reflector surface that is transparent to millimeter-wave RF and reflective to IR radiation. The imaging system has a relatively long focal length (f/d=0.55) and, as such, requires a large aperture for achieving the desired field of view. Since this area must be kept open, it would be necessary for the array antenna which is placed behind the antenna assembly to have an opening at the center of its aperture as well if an attempt were made to add an additional RF antenna by the use of a dichroic surface for the main reflector. This extra opening would result in a significant compromise in the antenna's gain and side-lobe level characteristics, thus making it undesirable to add a second RF antenna behind the antenna assembly.

As this brief discussion shows, those practicing in the art have not solved the specific problem of integrating multiple coaxial RF seeker antennas without causing performance degradation so severe that the expected increase in kill probability is lost. This is so although the problem has been long known in the art, moving many to search for a solution.

SUMMARY OF THE INVENTION

A multi-mode seeker antenna system allows detection of both infrared (IR) and a plurality of radio frequency (RF) energies using a single coaxial aperture. The multi-mode system uses well-known Cassegrainian optics for IR detection. Detection in a first RF band is integrated coaxially with the IR detector in the form of a dichroic parabolic reflector using a four-port monopulse RF feed. Detection in a second RF band can be implemented using one of several well-known active or passive array techniques such as a quadrantially-symmetric planar array of spiral antennas, a standard flat-plate slotted array, stripline-fed slot array, micro-strip patch array or any other suitable RF array. The seeker antenna for the second RF band is mounted behind the dichroic dual-mode detector to enhance performance in the IR and first RF band. The dual mode IR sensor primary reflector and the primary reflective surface of the RF antenna is transparent to the frequencies of the second RF seeker detection band. The parabolic dielectric material which supports the dichroic surface is tapered so that its thickness, as seen by the second RF antenna behind the dichroic surface, is constant. This overcomes the phase delay introduced by the curvature of the reflector and provides a substantially flat phase front. Alternatively, phase correction may be achieved by adding delay lines to the feed structure.

Less sensitivity to the size of the center hole for the IR assembly can be obtained by increasing the directivity of the elements of the second RF antenna. An image plate can be used and/or the elements can be formed in four sections with each section providing a particular phase and amplitude parameter to generate an amplitude comparison monopulse antenna.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and which.

DESCRIPTION OF THE PREFERRED EMBODIMENT

Figure 1:
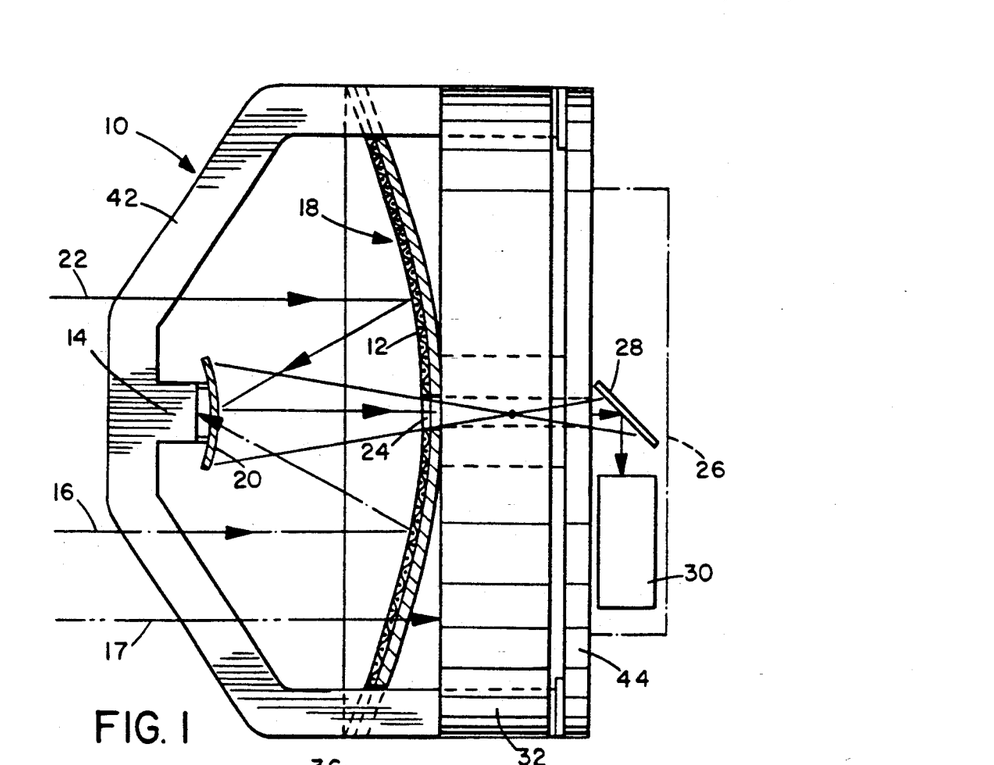
FIG. 1 is a schematic diagram of a preferred embodiment of the multi-spectral seeker antenna.

In FIG. 1, the multi-spectral seeker antenna assembly 10 is shown as it is mounted on a gimbaled platform (not shown) in the nose of a guided missile (not shown). The first RF mode consists of an active monopulse seeker antenna using a four-port monopulse feed 14 with a parabolic reflector 112 and a dichroic RF reflective surface selected to reflect the first RF operating frequency. Monopulse feed waveguide 42 carries the signal from monopulse feed 14 to monopulse comparator assembly 44. IR reflectors 18 and 20 focus the incoming IR radiation for detection by IR sensor 30. The second RF seeker antenna 32 is located behind parabolic reflector 12.

The first RF seeker system is subject to performance degradation caused by aperture occlusion so that precise control of both amplitude and phase is necessary to permit aperture tailoring for achieving a well-behaved antenna pattern. It is also desirable to maintain a relatively short focal length so that the four feed horns incorporated in feed 14 can be placed close together to minimize aperture blockage and to avoid restriction of gimbal motion. The parabolic monopulse seeker antenna requires high gain and low sidelobe parameters to provide bearing accuracy sufficient to minimize the effectiveness of available countermeasures. The azimuth and elevation difference channel nulls and beam peak symmetry must also be sufficient to minimize the effects of countermeasures. As is well-known in the art, aperture occlusion by other seeker antennas can cause severe deterioration of monopulse antenna performance parameters. See for instance "Chapter 38: Seeker Antennas" by Schuchardt et al., *Antenna Engineering Handbook*, 2nd ed, Richard C. Johnson and Henry Jasik, eds., McGraw Hill Book Company, New York.

Parabolic reflector 12 may comprise any suitable array or surface that is dichroic in that it is opaque to the first RF operating frequency and transparent to the second and subsequent RF operating frequencies. Typically, parabolic reflector 12 will consist of a dielectric material which is shaped as a parabola with a dichroic coating or pattern. The dichroic property is a function of the RF reflective pattern design. The pattern spacing is selected to provide opacity at the first RF frequency and transparency at a second RF frequency removed by one octave or more from the first RF frequency. Energy at the first RF operating frequency travels along path 16 as shown in FIG. 1. During transmission, RF energy is emitted by four-port monopulse RF feed 14, reflected from parabolic reflector 12, and transmitted along path 16. During reception, RF energy arrives on path 16, is reflected from parabolic reflector 12, received by four-port feed 14, and carried through monopulse feed waveguide 42 to monopulse comparator assembly 44.

Figure 5A:
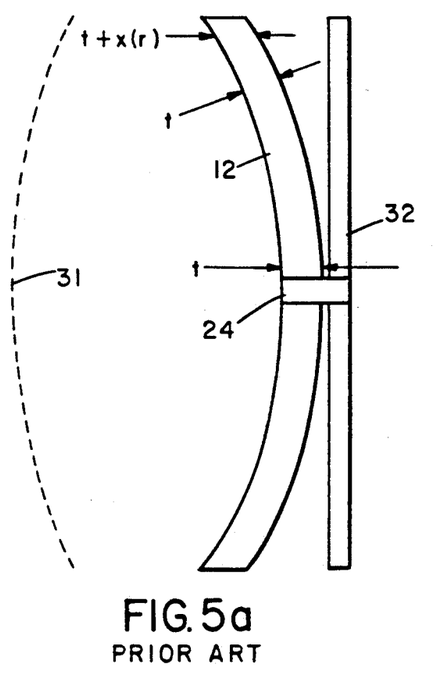
FIGS. 5a and 5b are diagrammatic views of phase fronts of a radiated wave according to the prior art and the present invention, respectively.
Figure 5B:
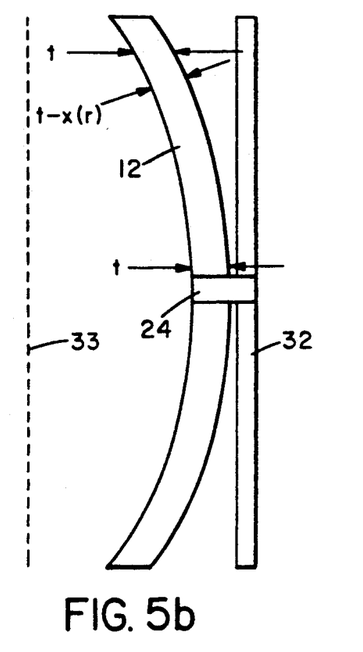

In order to provide the additional RF seeker antenna 32 behind the dichroic parabolic surface 12, the parabolic dielectric material which supports the dichroic surface is tapered in a manner such that its thickness, as seen from antenna 32 mounted behind the surface, is constant. As shown in FIG. 5a, if a mandrel is employed to form a dielectric support material it would maintain the thickness t over its entire surface. This thickness, as seen by the individual elements of the antenna 32, would appear to vary as a function of radius r, according to the relationship t +x(r). This variation would cause a corresponding phase delay from each element of antenna 32, which, in turn, causes a curved wave front 31. To compensate for this variation, the thickness of the dielectric material is tapered in a prescribed manner (t−x(r)), as shown in FIG. 5b, to provide flat wave front 33. Thus, the curvature of parabolic reflector 12 can be selected for the desired focal length for the first RF antenna with the thickness of the supporting dielectric being tapered to compensate for phase delay for the second RF antenna 32.

Figure 6:
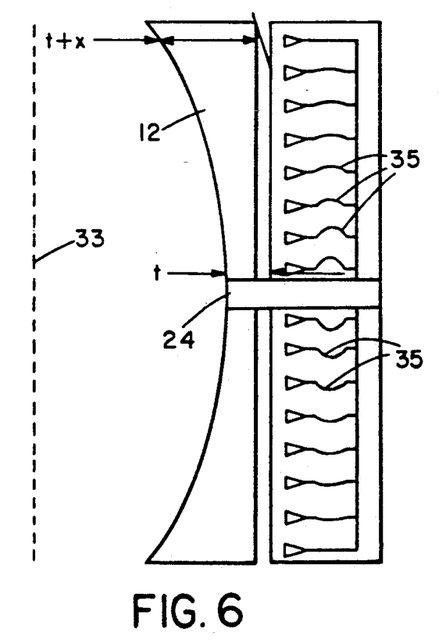
FIG. 6 is a diagrammatic view of an alternate means of phase correction.

Alternately, phase compensation can also be provided, as illustrated in FIG. 6, by adding delay lines 35 into the feed structure itself, also resulting in flat wave front 33.

The IR seeker system is composed of a Cassegrainian assembly comprising two mirrors. Referring to FIG. 1, primary IR reflector 18 is formed by coating parabolic reflector 12 with an infrared reflectance filter, built with multilayers of silicone and magnesium fluoride. The infrared reflector 18 is a quarter-wave interference filter with layer thicknesses selected for the operating IR spectral band and the angle of incidence selected for the desired collimated beam. The IR reflecting coating is dichroic in that it is opaque to the selected IR spectral band and transparent to all RF spectra below 100 GHz.

It is an important feature of this invention that the parabolic parameters of first RF reflector 12 can be modified as required during the layering and coating process to provide the necessary parabolic parameters for primary IR reflector 18. Secondary IR reflector 20 is similar to primary IR reflector 18 except that the substrate layer is not part of the first RF collector. Secondary IR reflector 20 is also transparent to RF spectra below 100 GHz. IR energy enters the Cassegrainian assembly along path 22, is reflected first off of primary IR reflector 18 and then off of secondary IR reflector 20, exiting through IR access hole 24 to IR processing assembly 26. The focal lengths of the primary and secondary reflectors are selected to minimize the size of IR access hole 24, thus limiting the impact of the aperture of antenna 32. IR processing assembly 26 consists of rotating IR mirror 28 and IR sensor 30. IR beam steering is obtained by moving IR mirror 28 as is well-known in the art. IR sensor 30 converts the IR energy into an electronic signal by well-known means (not shown).

Figure 2:
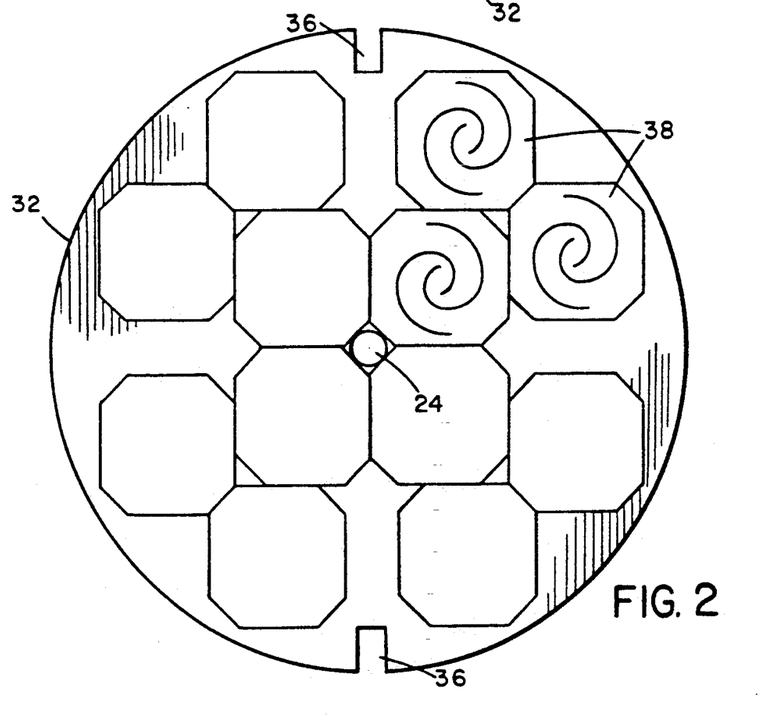
FIG. 2 is a schematic diagram of a typical planar spiral array.

Both the first RF seeker and the IR parabolic reflective surfaces are dichroic in that they reflect the proper operating frequencies and are transparent to the second and subsequent RF operating frequencies. Second RF seeker antenna 32 is mounted behind parabolic reflector 12 as shown in FIG. 1, and can be any one of several planar antenna types well-known in the art. The seeker shown in FIG. 2 is a monopulse spiral array 32 where the geometry is chosen to permit a central IR access hole 24. A ring array with quadrantal symmetry will satisfy this requirement and is known in the art. FIG. 2 shows a typical 12-element two-arm spiral array 32 with three elements per quadrant. Twelve-element spiral array 32 consists of 12 two-arm spiral antennas 38 arranged with the symmetry necessary to provide IR access hole 24 and waveguide feed access slots 36.

Array 32 is merely illustrative of a preferred embodiment. As is known in the art, the spiral array is a low power device which is primarily suited to passive or semi-active operation.

Figure 3:
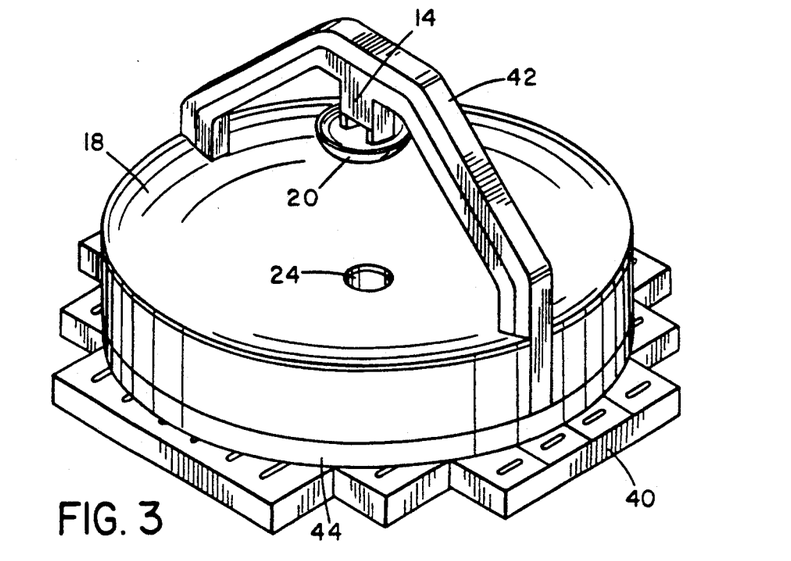
FIG. 3 is a schematic diagram of an alternate embodiment of the multi-spectral seeker antenna which uses a standard planar slotted array.
Figure 4:
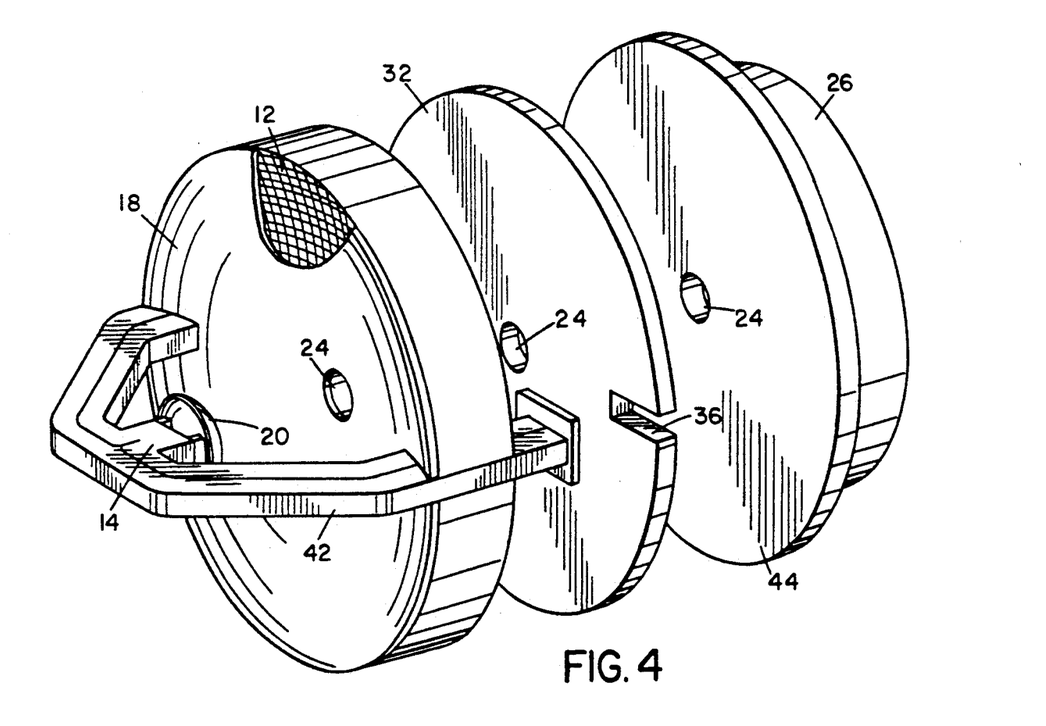
FIG. 4 is an exploded view of the preferred embodiment of the multi-spectral seeker antenna.

A standard flat plate slotted array is another suitable candidate for use as a second RF seeker system. Referring to FIG. 3, slotted array 40 with a small opening on its axis (not shown) is mounted behind primary IR reflector 18. The slotted array and its performance characteristics are known in the art, but the coaxial integration of slotted array 40 with the dual mode parabolic reflector 12 and primary IR reflector 18 is unknown. Slotted array 40 can be designed to operate actively as well as in a semi-active or passive mode. Semi-active operation requires that an active transmitting antenna located elsewhere illuminate the target with radiation at the second RF frequency. Active or passive operation is available from slotted array 40 in a manner well-known in the art.

A second RF seeker antenna 32, whether a spiral array such as antenna 38 in FIG. 2 or a slotted array such as slotted array 40 or a micro-strip patch array, stripline fed slot coax dipole array or any other type RF antenna array that can fit in FIG. 3, should have a maximum operating frequency of no more than half of the operating frequency of parabolic reflector 12. This choice of operating frequencies ensures that the second RF seeker antenna 32 will operate in a frequency region where the first RF seeker system comprising parabolic reflector 12 is transparent.

Figure 7:
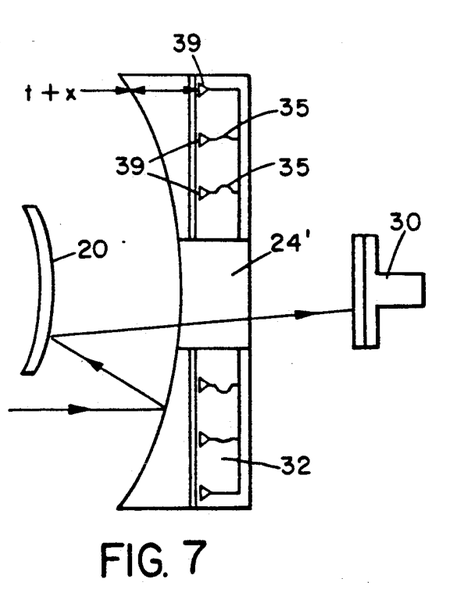
FIG. 7 is a schematic diagram of an antenna array for improved directivity.

While a small hole 24 is desirable to allow a virtually continuous amplitude distribution across the face of the aperture of antenna 32, modification of the array of antenna 32 makes it possible to obtain good results when a large opening is required for an IR/EO seeker such as offered by Droessler et al. As illustrated in FIG. 7, for an array antenna to provide a relatively continuous distribution across the face of the aperture with a large hole 24' in its center, the individual radiating elements 39 must possess an increased directivity so that they can be spaced relatively far apart. Elements 39 can be spirals, micro-strips patches, slot, dipoles or others. Several methods can be used to increase the directivity.

Figure 8:
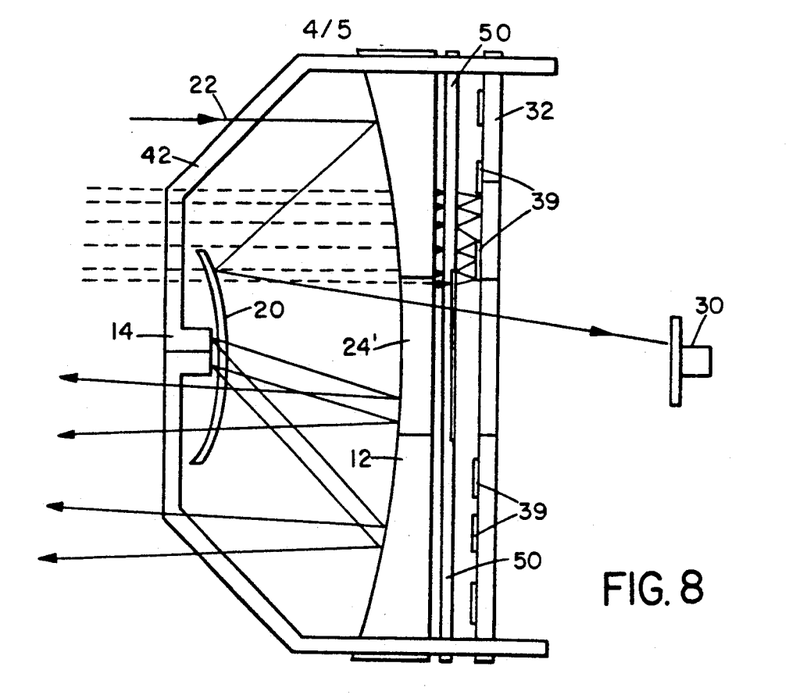
FIG. 8 is schematic diagram of an alternate embodiment of the present invention.

A first method consists of affixing an image plate 50 in front of the array's radiating elements 39 in order to enhance their individual directive properties, as illustrated in FIG. 8. This image plate 50 would be reflective of the radiated wave from the front feed 14 and transparent to the IR/EO seeker. Since the image plate 50 is resonant at the frequency of the antenna 32, it must be designed such that it is transparent to the IR/EO system. The reflective surface of the image plate 50 must also consist of a resonant surface in the area where it is transparent to the IR/EO radiation. In the alternative, other directive elements could be used for the individual radiations 39, including polyrod, Yagi, zig-zag or helical radiators.

The use of directive elements within the array of antenna 32 is further advantageous in that the antenna 32 possesses low sidelobe levels at both the sum and difference output ports. To achieve this, the mechanism employed for feeding the individual radiating elements is designed such that four beams are formed in a manner such that an amplitude comparison monopulse system is realized.

Figures 9A, 9B:
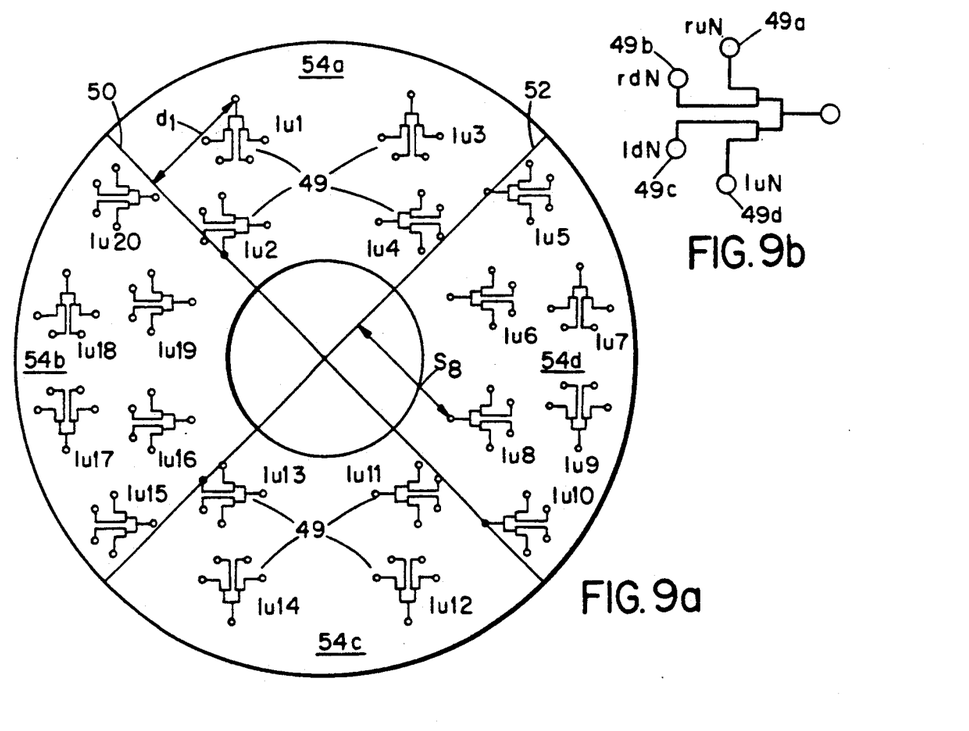
FIGS. 9a and 9b are schematic diagrams of a directive array and element, respectively.
Figure 10A:
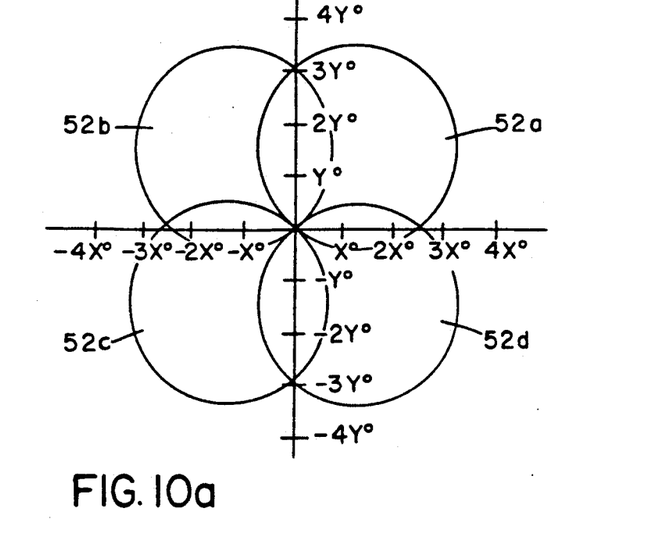
FIGS. 10a, 10b and 10c are schematic diagrams of the beam patterns of the directive array of FIG. 9.
Figure 10B:
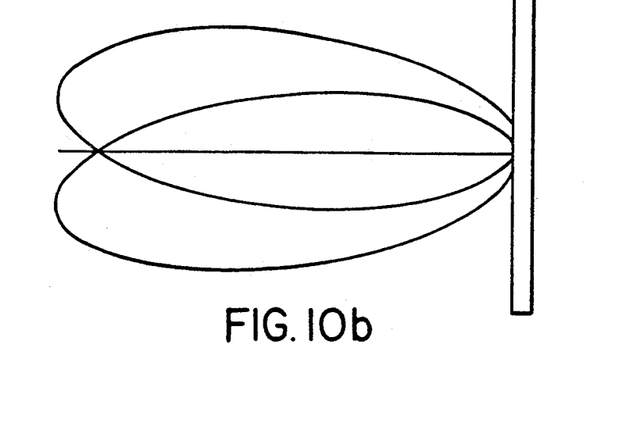
Figure 10C:
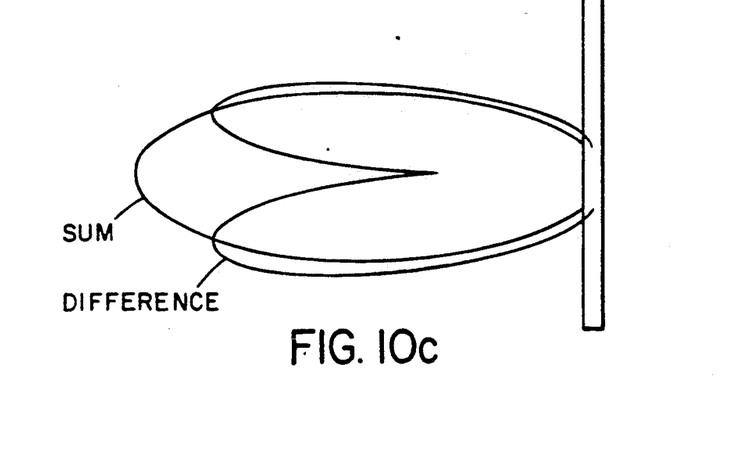

Looking at FIG. 9, each element 49 is divided into four sections, a, b, c and d, where each section corresponds to one of four beam positions. Each output a, b, c or d from each element 49 is assigned a particular phase and amplitude parameter such that the resultant wavefront of the array, when combined, will provide one of the four beams shown in FIG. 10*a*, which is a contour plot of individual beams before monopulse processing. FIG. 10*b* illustrates the radiation patterns of individual output ports. When these four beams 52*a, b, c* and *d*, are processed through a monopulse comparator, the result will be an amplitude monopulse seeker antenna with the resultant monopulse patterns after processing shown in FIG. 10*c*. This provides low difference port sidelobes. The typical method for providing a monopulse output from a flat plate array is by feeding all of the elements 49 in phase and combining the four quadrants 54*a, b, c* and *d* such that a phase comparison monopulse seeker is realized. The relative phase to the four outputs for the left-up beam position 49*d* for the nth element is given as:

$$\psi_{lun} = \left(\frac{2\pi d_n}{\lambda}\right)\sin\theta_t \quad (1)$$

where $\theta_t$ is the required beam tilt angle in the left-up position 48*d*, $\lambda$ is the wavelength of the array's operating frequency, and $\pm d_n$ is the distance from the $-45°$ diameter line 50, in FIG. 9*b* to the element, with + or − denoting direction from line 50.

$$\theta_t \approx \frac{BW}{2} \quad (2)$$

where BW is the beamwidth of the array or:

$$BW = \frac{60\lambda}{d} \quad (3)$$

where d is the array diameter.

For the other three beam positions 49*a*, 49*b* and 49*c*, the relative phases are:

$$\psi_{ldn} = \left(\frac{2\pi(-d_n)}{\lambda}\right)\sin\theta_t$$

$$\psi_{run} = \left(\frac{(2\pi s_n)}{\lambda}\right)\sin\theta_t$$

$$\psi_{rdn} = \left(\frac{2\pi(-s_n)}{\lambda}\right)\sin\theta_t$$

where $\pm s_n$ is the distance from the $+45°$ diameter line 52 to the element, with + or − denoting direction from line 52.

The multi-spectral seeker antenna of the present invention provides a system which can simultaneously detect two different RF signals and IR radiation without significant interference between the different detectors. While combinations in the prior art have combined two different frequencies, either two RF or IR and RF, they have been configured in such a way that the addition of a third antenna would obscure or detract from the efficiencies of the existing antennas.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. A multi-spectral seeker system for detecting radiation within a plurality of frequency bands throughout the electromagnetic spectrum, a first band being in the ultraviolet-through-infrared portion and at least two additional bands being in the remaining lower frequency portion of said spectrum, comprising:

a first dichroic energy collection means, being transparent to radiant energy in said additional bands and having a first boresight axis, for collecting energy in said first band;

first conversion means for converting radiant energy collected in said first band to an electrical signal;

a second dichroic energy collection means, being transparent to radiant energy in all but the first of said additional bands and having a second boresight axis, for collecting energy in said first additional band;

second conversion means for converting radiant energy collected in said first additional band to an electrical signal;

at least one third energy collection means, having a third boresight axis, for collecting energy in the second of said additional bands and for converting that energy to an electrical signal; and phase compensation means for correcting phase error in said second additional band introduced by said first dichroic energy collection means;

wherein said first and second dichroic energy collection means are located coaxially one behind the other and said at least one third energy collection means are located behind and coaxially with said first and second dichroic energy collection means.

2. The multi-spectral seeker system of claim 1 wherein said first dichroic energy collection means comprises:

a Cassegrainian primary reflector (18) for reflecting, along said first boresight axis, the radiant energy in said first band; and a Cassegrainian secondary reflector (20) positioned on said boresight axis for re-reflecting radiant energy reflected from said primary reflector along said first boresight axis and for focusing said re-reflected radiant energy in a focal plane about said first boresight axis.

3. The multi-spectral seeker system of claim 1 wherein:

said second dichroic energy collection means is a parabolic reflector (12), having a focal point on said second boresight axis, additionally serving to reflect and thereby transmit radiant energy in said first additional band; and further comprising emitting means for creating and emitting of radiant energy comprising:

generating means for creating said radiant energy in said first additional band;

waveguide means for directing said radiant energy to said focal point; and a monopulse feed located at said focal point for transferring said radiant energy from said waveguide means to free space in the direction of said parabolic reflector (12).

4. The multi-spectral seeker system of claim 1 wherein said at least one third energy collection means comprises a planar spiral array.

5. The multi-spectral seeker system of claim 1 wherein said at least one third energy collection means comprises a planar slotted array.

6. The multi-spectral seeker system of claim 2 wherein said first conversion means (26) comprises:
   scanning means (28) for redirectinig said radiant energy on said focal plane to a fixed point; and
   sensing means (30) located at said fixed point for converting said redirected energy to an electrical signal.

7. The multi-spectral seeker system of claim 3 wherein said parabolic reflector (12) comprises a RF reflective surface.

8. The multi-spectral seeker system of claim 3 wherein said parabolic reflector (12) comprises a dichroic surface disposed on a parabolic dielectric material having a thickness which is tapered as a function of radius.

9. The multi-spectral seeker system of claim 3 wherein said at least one third energy collection means comprises a planar spiral array.

10. The multi-spectral seeker system of claim 9 wherein said first dichroic energy collection means comprises:
   a Cassegrainian primary reflector (18) for reflecting, along said first boresight axis, the radiant energy in said first band; and
   a Cassegrainian secondary reflector (20) positioned on said boresight axis for re-reflecting radiant energy reflected from said primary reflector along said first boresight axis and for focusing said re-reflected radiant energy in a focal plane about said first boresight axis.

11. The multi-spectral seeker system of claim 10 wherein said first conversion means (26) comprises:
   scanning means (28) for redirecting said radiant energy on said focal plane to a fixed point; and
   sensing means (30) located at said fixed point for converting said redirected energy to an electrical signal.

12. The multi-spectral seeker system of claim 11 wherein said parabolic reflector comprises a RF reflective surface.

13. The multi-spectral seeker system of claim 12 wherein said resonant parabolic reflector comprises a dichroic surface disposed on a parabolic dielectric material having a thickness which is tapered as a function of radius.

14. The multi-spectral seeker system of claim 1 wherein said at least one third energy collection means includes an image plate.

15. The multi-spectral seeker system of claim 1 wherein said at least one third energy collection means comprises an array of directive radiating elements.

* * * * *